United States Patent [19]
Weltz et al.

[11] Patent Number: 5,487,088
[45] Date of Patent: Jan. 23, 1996

[54] APPARATUS FOR MONITORING LAMP SYSTEM STATUS

[75] Inventors: Richard Weltz, Richmond, Va.; David J. Milius, El Paso, Tex.

[73] Assignee: Infilco Degremont, Inc., Richmond, Va.

[21] Appl. No.: 144,637

[22] Filed: Oct. 28, 1993

[51] Int. Cl.$^6$ .................................................. H05B 41/16
[52] U.S. Cl. ...................... 315/276; 315/277; 315/209 R; 315/129; 315/DIG. 7
[58] Field of Search ........................... 315/129, 86, 276, 315/277, DIG. 7, 254, 312, 324, 130, 241 P, 241 S, 209 R

[56] References Cited

U.S. PATENT DOCUMENTS

| | | | |
|---|---|---|---|
| 2,923,855 | 2/1960 | Carlson, Jr. | 315/129 |
| 3,567,994 | 3/1971 | Weiss | 315/276 |
| 4,297,614 | 10/1981 | Chandler | 315/86 |
| 4,330,736 | 5/1982 | Perper | 315/209 R |
| 4,701,672 | 10/1987 | Sikora | 315/129 X |
| 4,868,509 | 9/1989 | Ury et al. | 315/277 X |
| 4,945,280 | 7/1990 | Beghelli | 315/129 |
| 4,952,848 | 8/1990 | Erhardt | 315/DIG. 7 X |
| 4,975,649 | 12/1990 | Bobry | 324/547 |

FOREIGN PATENT DOCUMENTS 2059196  4/1981  United Kingdom .................. 315/129

*Primary Examiner*—Robert J. Pascal
*Assistant Examiner*—Haissa Philogene
*Attorney, Agent, or Firm*—Miller & Christenbury

[57] ABSTRACT

A lamp system including an alternating current power source for supplying a signal voltage, an input transformer having primary and secondary windings connected to the power source for increasing signal voltage, a signal rectifier connected to the secondary winding for creating a direct current signal from the increased signal voltage, a signal oscillator connected to the signal rectifier for creating a high-frequency signal from the direct current signal, one or more ballasts connected to the signal oscillator to create high-voltage high-frequency signals from the direct current signal, one or more lamps driven by the high-voltage high-frequency signal from the ballasts, a sense winding on an output side of each of the ballasts for inducing alternating current signals, an apparatus for receiving and processing the alternating current signals, and an apparatus for displaying the processed alternating current signals.

29 Claims, 3 Drawing Sheets

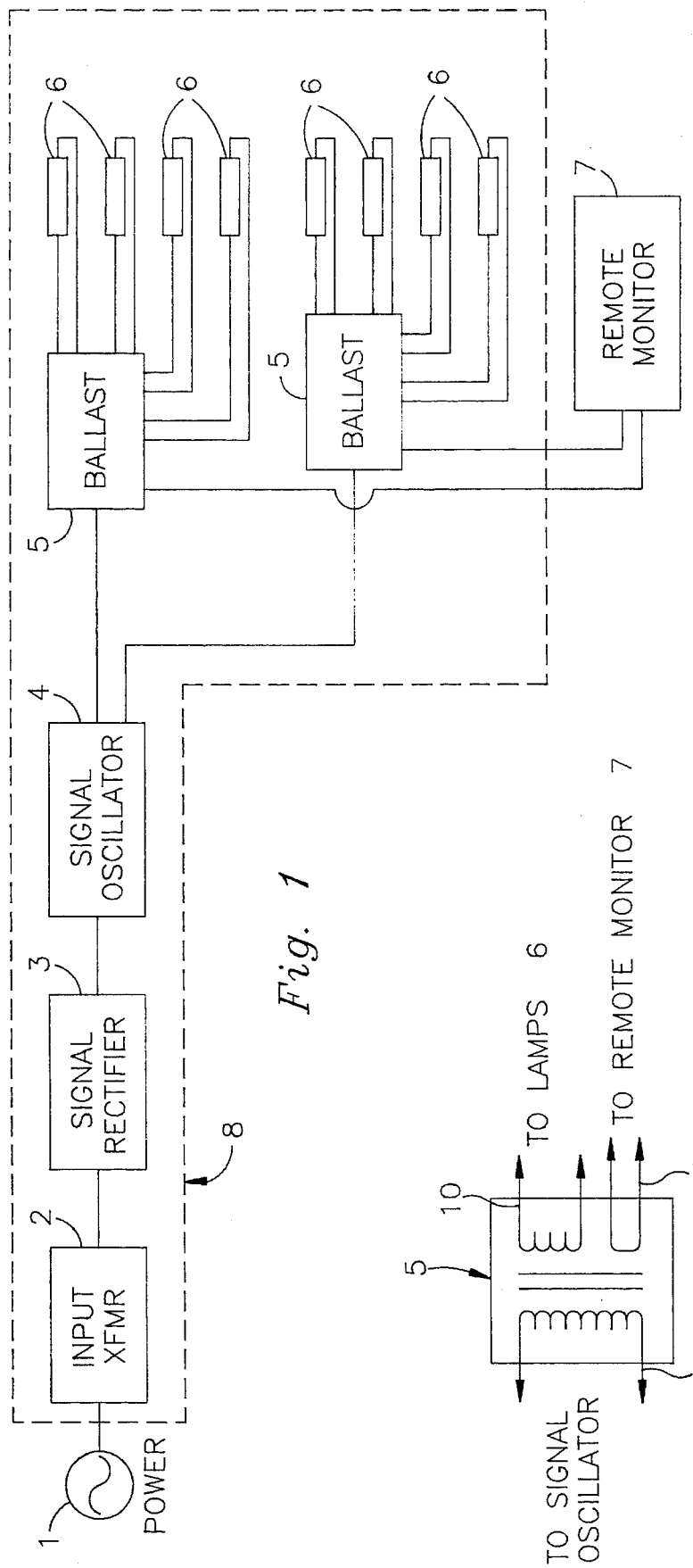

APPARATUS FOR MONITORING LAMP SYSTEM STATUS

FIELD OF THE INVENTION

The present invention relates to an apparatus for monitoring lamp system status, particularly an apparatus for monitoring operation of lamps used in critical or essential services or where remote indication of lamp operation is desired, such as in monitoring emergency lighting fixtures, monitoring mercury vapor discharge lamps or germicidal ultraviolet lamps, monitoring low pressure mercury vapor discharge lamps or in monitoring low pressure germicidal ultraviolet lamps and solid state ballasts or electronic lamp controllers from a remote location.

BACKGROUND OF THE INVENTION

Complex lamp systems incorporating a large array of lamps and electronic lamp controllers are commonly used in industry for a variety of purposes. Because of the nature of these systems and their purposes, the lamps and the ballasts or electronic lamp controllers incorporated into the systems are often of limited and difficult accessibility. Efficient use of these systems requires that these important components of the lamp system be monitored to keep the system functioning properly. Effective monitoring is important to both maintain the system operating efficiency and reduce costs.

One area where the apparatus of the present invention would be of particular interest, although not limited thereto, is in the rapidly developing area of systems and apparatus for disinfection of water with ultraviolet light, spurred by increased environmental awareness, the accompanying regulation associated with disposal and treatment of waste and potable water and the desire to avoid or reduce reliance on chemical treatment. This growing need has resulted in a number of systems that employ germicidal ultraviolet lamps to disinfect such waste water.

It is important in completing this difficult task of ultraviolet treatment that the operation of lamps employed in the system be monitored accurately and efficiently to ensure that all the water be treated by full exposure to at least the minimum required dosage of ultraviolet radiation produced by the lamps. Not accurately monitoring the status of the lamps in the system could result in untreated or improperly treated water, which can have serious health and/or environmental consequences. One means to accomplish this critical task is to closely monitor the ultraviolet lamps and the solid state ballasts or electronic lamp controllers, checking the status of operation of the system to insure that all lamps in the system are operating properly.

DESCRIPTION OF THE PRIOR ART

One typical manner in which fluorescent lamp and ballast monitoring has been conducted is by on-site physical inspection of the lamps and the solid state ballasts or electronic lamp controllers to determine their operating status. However, such a method both increases the cost of monitoring by requiring continuous inspection by maintenance personnel and decreases efficiency due to the lag between loss of operation and system repair. Also, ballasts and lamp controllers are frequently difficult to easily access for regular control monitoring purposes.

Remote monitoring of the lamps and the system reduces cost and increases efficiency because of the disadvantages discussed above. For example, U.S. Pat. No. 3,567,994 allows for remote monitoring of a fluorescent lamp system by insertion of a testing device by means of quick connect terminals between the system lamps and the solid state ballast. However, '994 has the troublesome disadvantage of requiring system disconnection and discontinuance of operation to check the system status. Of course, system interruption is highly undesirable in many applications, such as in ultraviolet disinfection.

Another known method of remote monitoring is by continuous sampling of the high energy input or high energy output electrical signal of the solid state ballast or electronic lamp controller. These devices have a disadvantage, however, since they may provide false indications of the system status. A failed solid state ballast or electronic lamp controller may still draw an input current and burned-out lamps may cause the output signal to vary, producing an incorrect reading of the system status. In the case of ultraviolet disinfection systems, for example, incorrect monitoring can cause severe problems in maintaining proper ultraviolet radiation dosages in waste-water treatment.

It is important that monitoring the system status of an ultraviolet lamp system be done in the most accurate and efficient manner possible. Typical monitoring systems require physical on-site inspection or disconnection of the system to check the system status. Additionally, continuous remote, monitoring of lamp systems by sampling the high energy input or the high energy output signal can lead to false indications of the system status. These deficiencies lead to a reduction in accuracy and efficiency of the lamp system and result in the many serious disadvantages discussed above.

OBJECTS OF THE INVENTION

An object of the present invention is to provide an apparatus for monitoring the status of lamps such as mercury vapor discharge lamps or low pressure germicidal ultraviolet lamps and solid state ballasts or electronic lamp controllers remotely, without the necessity of physical on-site inspection.

It is another object of the present invention to provide a monitoring apparatus which does not require troublesome disconnection or discontinuance of operation of the lamp system.

It is a further object of the invention to provide a monitoring apparatus which reduces the possibility of false indications of the lamp system status.

Other objects and advantages of the present invention will become apparent to those skilled in the art from the drawings, detailed descriptions of preferred embodiments and the appended claims.

SUMMARY OF THE INVENTION

The invention provides a novel apparatus for remotely monitoring a lamp system. The invention includes a ballast or electronic lamp controller of a mercury vapor discharge or ultraviolet lamp system or the like with an additional sense winding connected by way of a single turn on the output side of the ballast or electronic lamp controller. The invention also includes a remote monitor which is connected to the sense winding. The remote monitor includes a display apparatus to display a current, voltage, and/or logic signal which is indicative of the ballast and/or lamp status. The remote monitor also includes additional circuitry for receiving and processing the alternating current signal from the sense winding of the ballast.

BRIEF DESCRIPTION OF THE DRAWINGS

FIG. 1 shows a block diagram of a lamp system and a remote monitor in accordance with aspects of the invention.

FIG. 2 shows an exploded schematic of a ballast and connections to portions of the lamp system shown in FIG. 1.

DETAILED DESCRIPTION OF THE INVENTION

Figure 3:
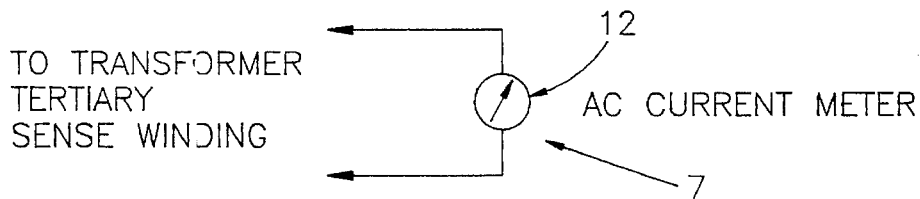
FIG. 3 shows one embodiment of the remote monitor from FIG. 1 in accordance with aspects of the invention.

The following description is intended to refer to the specific embodiments of the invention depicted for illustration in the drawings and is not intended to define or limit the invention, other than as in the appended claims.

FIG. 1 shows a mercury vapor discharge or ultraviolet lamp system 8 with a remote monitor 7 in accordance with an embodiment of the present invention. An alternating current power source 1 is connected in a standard, well known manner to input transformer 2 to increase the signal voltage. Input transformer 2 is connected in a standard manner to signal rectifier 3 which creates a high voltage DC signal. Signal rectifier 3 is connected in a standard manner to signal oscillator 4 which creates a high frequency signal. Signal oscillator 4 is connected in a standard manner to a pair of ballasts 5 which are connected to and drive output lamps 6 and remote monitor 7.

FIG. 2 shows an exploded, detailed view of the components of ballast 5. The term "ballast" used hereinafter is intended to include any number of devices commonly known in the art as ballasts, as well as other similar devices known in the art such as electronic lamp controllers and the like. For example, ballast 5 may include an output transformer only; an output transformer with regulatory circuitry, such as a DC blocking capacitor; or an electronic lamp controller containing an output transformer and electronics to control lamps 6. Primary winding 9 of ballast 5 connects to and is energized by signal oscillator 4. Primary winding 9 induces a current in secondary winding 10 which drives output lamps 6, inducing a low energy alternating current signal in sense winding 11 which is connected to remote monitor 7 and receives the low energy alternating current signal.

Figure 4:
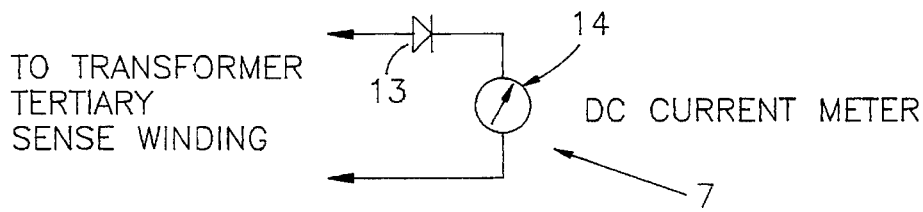
FIG. 4 shows another embodiment of the remote monitor from FIG. 1.

FIG. 3 shows one embodiment of a portion of the invention wherein remote monitor 7 is AC current meter 12. Meter 12 connects directly to sense winding 11 which drives alternating current meter 12. FIG. 4 shows a second embodiment of a portion of the invention wherein sense winding 11 of FIG. 2 is connected in series with rectifier 13 and DC current meter 14, which forms remote monitor 7.

Figure 5:
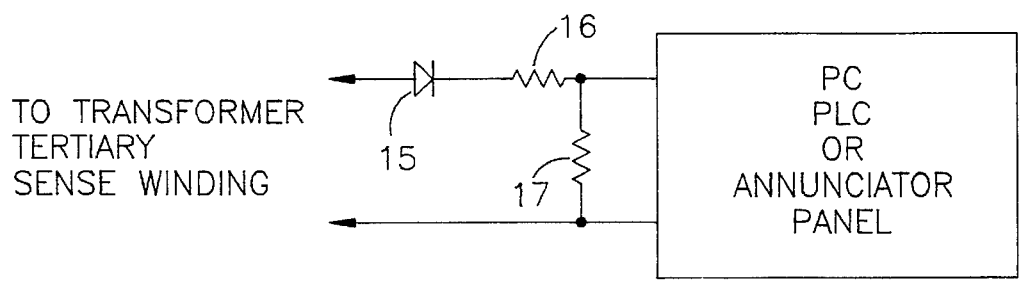
FIG. 5 shows a third embodiment of the remote monitor from FIG. 1.
Figure 6:
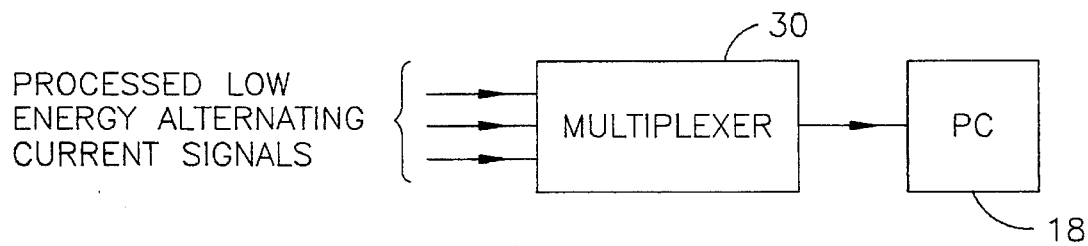
FIG. 6 shows a modification of the third embodiment for use in a lamp system with an array of lamps and ballasts.

FIG. 5 shows a third embodiment of a portion of the invention wherein sense winding 11 of FIG. 2 is connected in series with rectifier 15 and resistance 16 and in parallel with resistance 17 and display 18, which may consist of a personal computer, programmable logic controller, annunciator panel or the like. FIG. 6 shows the insertion of a multiplexer 30 to the embodiment shown in FIG. 5 to encode an array of low energy current signals, where the output of multiplexer 30 is connected to display 18.

Figure 7:
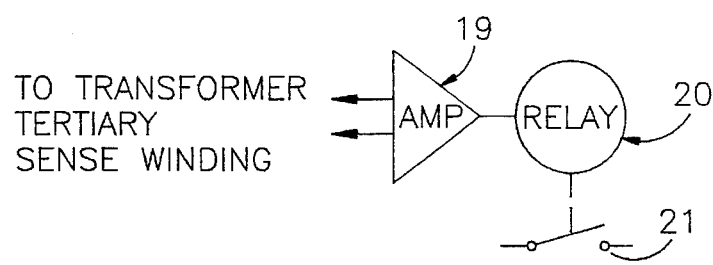
FIG. 7 shows a fourth embodiment of the remote monitor from FIG. 1.
Figure 8:
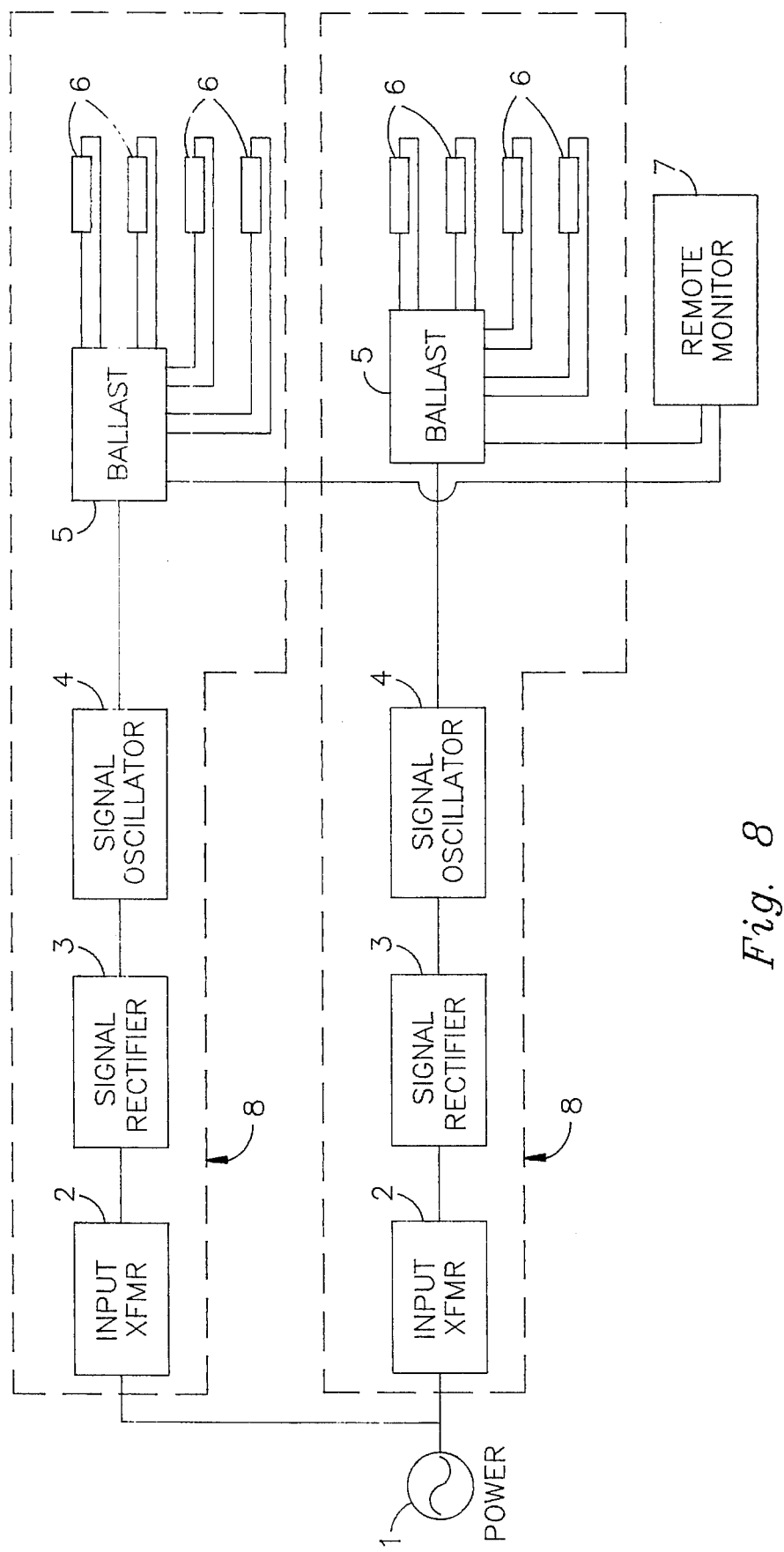
FIG. 8 shows a block diagram of an alternate form of a lamp system and a remote monitor in accordance with aspects of the invention.

FIG. 7 shows a fourth embodiment of a portion of the invention wherein sense winding 11 of FIG. 2 is connected to an input terminal of amplifier 19. An output terminal of amplifier 19 is connected to relay 20 which connects to switch 21. FIG. 8 shows an alternate embodiment of the invention shown in FIG. 1.

Turning now to the drawings generally, the use and operation of the apparatus for remotely monitoring a lamp system status will be described below in the context of a most preferred ultraviolet light disinfection module with multiple lamps 6. The structure of such modules is known in the art and not discussed herein. The lamp system within the module is illustrated in FIGS. 1 and 8 by lamp system 8 where there is an array of ultraviolet lamps 6 and ballasts 5. The lamps 6 and ballasts 5 are monitored at a point removed from the module by remote monitor 7.

During operation of lamps 6, AC power is supplied from power source 1 to input transformer 2, which increases signal voltage. The increased signal voltage is converted to a high voltage DC signal by signal rectifier 3. The high voltage DC signal is converted to a high frequency signal by signal oscillator 4. When primary winding 9 of ballast 5 is energized by signal oscillator 4 and an output signal is induced in secondary winding 10, a low level alternating current signal is induced in sense winding 11. The low level alternating current signal is transmitted to remote monitor 7.

The present invention allows for remote monitoring of the system status with a low energy signal isolated from the hazardous high voltage circuitry normal to lamp ballasts, since this signal is induced in a separate sense winding. The presence of a steady alternating current signal at the display indicates that the system is operating correctly. Variations in or an absence of this signal indicates that the system is working incorrectly. The possibility of a false indication of a failed ballast 5 is eliminated by using the output side of the output transformer and not the input side.

In a particularly preferred embodiment of the invention illustrated in FIG. 5, the induced low energy alternating current signal from sense winding 11 is passed through rectifier 15 and a resistance 16 and then across a resistance 17 and a display 18. The absence of the low energy alternating current signal with power supplied to ballast 5 indicates a failed ballast. A variation in the low energy alternating current signal with power supply to ballast 5 indicates variations in the high energy output signal of secondary winding 10 and a possible failed lamp. Even though a failed ballast 5 may still draw an input current, the possibility of a false indication on display 18 is eliminated since the low energy alternating current signal is induced from the output of ballast 5.

The use of a personal computer, programmable logic controller or annunciator panel 18 allows for a complete array of ballasts and lamps to be monitored at display 18. The low energy alternating current signal from each sense winding 11 can be processed by a manner commonly known in the art to allow personal computer, programmable logic controller or annunciator panel 18 to indicate which ballast or which group of lamps has failed.

FIG. 6 illustrates one possible manner of doing this. Each independent low energy alternating current signal is fed into multiplexer 30 which encodes the signals in a standard fashion and transmits them to a computer or the like. Software used on the computer decodes the information sent from multiplexer 30 and indicates which ballast 5 or group of lamps 6 has failed.

In the second embodiment of the invention illustrated in FIG. 3, the induced low energy alternating current signal from sense winding 11 is passed through AC current meter 12. The deflection of AC current meter 12 indicates the presence of, the absence of, or variation in the low energy alternating current signal. Changes in AC current meter 12 indicate a failed ballast 5 or possible failed lamp 6 as previously described.

In the embodiment of the invention illustrated in FIG. 4, the induced low energy alternating current signal from sense winding 11 is passed through a rectifier 13 and DC current meter 14. The steady deflection of DC current meter 14 indicates that the system is operating properly. The absence of or variation in the deflection of DC current meter 14 indicates the absence of or variation in the low energy alternating current signal, indicating a failed ballast 5 or a possible failed lamp 6 as previously described.

In the embodiment of the invention illustrated in FIG. 7, the induced low energy alternating current signal from sense winding 11 is placed across the input of signal amplifier 19. The output of amplifier 19 is placed across relay 20 which is connected to switch 21. Absence of the low energy alternating current signal at the input to amplifier 19 reduces the output current of amplifier 19 to zero, de-energizing relay 20 which will trip switch 21. This indicates a failed ballast 5.

Although this invention has been described in connection with specific forms thereof, it will be appreciated that a wide variety of equivalents may be substituted for the specific elements shown and described herein without departing from the spirit and scope of this invention as described in the appended claims. For example, the lamps may be fluorescent, mercury vapor discharge, sodium vapor discharge or the like. Ballast 5 may consist of an output transformer, electronic controller, or the like. Additionally, there may be an array of signal oscillators 4, signal rectifiers 3, input transformers 2, ballasts 5 and lamps 6 as well known in the art. Personal computers, programmable logic controllers and annunciators and the like employed herein may be of any type commonly known in the art and may be connected and used in manners typical of the art. Resistances may include resistors, variable resistors or the like.

What is claimed is:

1. Ballast monitoring apparatus for a lamp system having one or more lamps and one or more ballasts connected to said lamps comprising:

a sense winding contained on an output side of said ballasts for inducing a ballast status signal;

ballast monitoring means for receiving and processing said ballast status signal; and means for displaying said processed ballast status signal.

2. The apparatus defined in claim 1 wherein the means for displaying said processed ballast status signal is an AC current meter.

3. The apparatus defined in claim 1 wherein the means for displaying said processed ballast status signal is a DC current meter.

4. The apparatus of claim 3 wherein said means for receiving and processing said ballast status signal is a rectifier in series with said DC current meter.

5. The apparatus defined in claim 1 wherein the means for displaying said processed ballast status signal is a computer.

6. The apparatus of claim 5 wherein the means for receiving and processing said ballast status signal is a rectifier in series with a first resistance which is in series with a second resistance, said second resistance being in parallel with said computer.

7. The apparatus of claim 5 wherein the means for receiving and processing said ballast status signal is a rectifier in series with a first resistance which is in series with a second resistance, said second resistance being in parallel with the input of a multiplexer, the output of said multiplexer being connected with said computer.

8. The apparatus defined in claim 1 wherein the means for displaying said processed ballast status signal is a programmable logic controller.

9. The apparatus of claim 8 wherein the means for receiving and processing said ballast status signal is a rectifier in series with a first resistance which is in series with a second resistance, said second resistance being in parallel with said programmable logic controller.

10. The apparatus defined in claim 1 wherein the means for displaying said processed ballast status signal is an annunciator panel.

11. The apparatus of claim 10 wherein the means for receiving and processing said ballast status signal is a rectifier in series with a first resistance which is in series with a second resistance, said second resistance being in parallel with said annunciator panel.

12. The apparatus defined in claim 1 wherein the means for displaying said processed ballast status signal is a switch.

13. The apparatus of claim 12 wherein the means for receiving and processing said ballast status signal is a relay connected to said switch and connected to an output of a signal amplifier, an input of said signal amplifier being connected to said sense winding.

14. A lamp system capable of monitoring ballasts comprising:

an alternating current power source for supplying a signal voltage, an input transformer having primary and secondary windings connected to said power source for increasing said signal voltage;

a signal rectifier connected to said secondary winding for creating a direct current signal from said increased signal voltage;

a signal oscillator connected to said signal rectifier for creating a high-frequency signal from said direct current signal;

one or more ballasts connected to said signal oscillator to create high-voltage high-frequency signals from said direct current signal;

one or more lamps driven by said high-voltage high-frequency signal from said ballasts;

a sense winding on an output side of each of said ballasts for inducing ballast status signals;

ballast monitoring means for receiving and processing said ballast status signals; and means for displaying said processed ballast status signals.

15. The lamp system defined in claim 14.wherein the lamps are selected from the group consisting of fluorescent, mercury vapor discharge and sodium vapor discharge.

16. The lamp system defined in claim 14 wherein said fluorescent lamps are ultraviolet radiation producing.

17. The lamp system of claim 1.4 wherein the means for displaying said processed ballast status signal is a computer.

18. The lamp system of claim 17 wherein the means for receiving and processing said ballast status signal is a rectifier in series with a first resistance which is in series with a second resistance, said second resistance being in parallel with said computer.

19. The lamp system of claim 17 wherein the means for receiving and processing said ballast status signal is a rectifier in series with a first resistance which is in series with a second resistance, said second resistance being parallel with the input of a multiplexer, the output of said multiplexer being connected with said computer.

20. The lamp system of claim 14 wherein the means for displaying said processed ballast status signal is a programmable logic controller.

21. The lamp system of claim 20 wherein the means for receiving and processing said ballast status signal is a rectifier in series with a first resistance which is in series with a second resistance, said second resistance being in parallel with said programmable logic controller.

22. An apparatus for monitoring a lamp system having one or more lamps comprising:

one or more ballasts connected to said lamps;

a sense winding contained within said ballast for inducing an alternating current signal;

means for receiving and processing said alternating current signal including a rectifier in series with a first resistance which is in series with a second resistance; and a computer for displaying said processed alternating current signal, said second resistance being in parallel with said computer.

23. The apparatus of claim 22 wherein said means for receiving and processing further comprises a multiplexer in parallel with said second resistance, the output of said multiplexer being connected with said computer.

24. An apparatus for monitoring a lamp system having one or more lamps comprising:

one or more ballasts connected to said lamps;

a sense winding contained within said ballast for inducing an alternating current signal;

means for receiving and processing said alternating current signal including a rectifier in series with a first resistance which is in series with a second resistance; and a programmable logic controller for displaying said processed alternating current signal, said second resistance being in parallel with said programmable logic controller.

25. An apparatus for monitoring a lamp system having one or more lamps comprising:

one or more ballasts connected to said lamps;

a sense winding contained within said ballast for inducing an alternating current signal;

means for receiving and processing said alternating current signal including a rectifier in series with a first resistance which is in series with a second resistance; and an annunciator panel for displaying said processed alternating current signal, said second resistance being in parallel with said annunciator panel.

26. An apparatus for monitoring a lamp system having one or more lamps comprising:

one or more ballasts connected to said lamps;

a sense winding contained within said ballast for inducing an alternating current signal;

means for receiving and processing said alternating current signal including a relay; and a switch for displaying said processed alternating current signal, said relay connected to said switch and connected to an output of a signal amplifier, an input of said signal amplifier being connected to said sense winding.

27. A lamp system comprising:

an alternating current power source for supplying a signal voltage;

an input transformer having a primary and secondary winding connected to said power source for increasing said signal voltage;

a signal rectifier connected to said secondary winding for creating a direct current signal from said increased signal voltage;

a signal oscillator connected to said signal rectifier for creating a high-frequency signal from said direct current signal;

one or more ballasts connected to said signal oscillator to create high-voltage, high-frequency signals from said direct current signal;

one or more lamps driven by said high-voltage, high-frequency signal from said ballast;

a sense winding on the output side of each of said ballasts for inducing alternating current signals;

means for receiving and processing said alternating current signal including a rectifier in series with a first resistance which is in series with a second resistance; and a computer for displaying said processed alternating current signal, the computer being in parallel to the second resistance.

28. The lamp system of claim 27 wherein said means for receiving and processing further comprises a multiplexer parallel with said second resistance, the output of said multiplexer being connected with said computer.

29. A lamp system comprising:

an alternating current power source for supplying a signal voltage;

an input transformer having a primary and secondary winding connected to said power source for increasing said signal voltage;

a signal rectifier connected to said secondary winding for creating a direct current signal from said increased signal voltage;

a signal oscillator connected to said signal rectifier for creating a high-frequency signal from said direct current signal;

one or more ballasts connected to said signal oscillator to create high-voltage, high-frequency signals from said direct current signal;

one or more lamps driven by said high-voltage, high-frequency signal from said ballast;

a sense winding on the output side of each of said ballasts for inducing alternating current signals;

means for receiving and processing said alternating current signal including a rectifier in series with a first resistance which is in series with a second resistance; and a programmable logic controller for displaying said processed alternating current signal, the programmable logic controller being in parallel with the second resistance.

\* \* \* \* \*